Jan. 31, 1950  E. MEIERJOHAN  2,495,980
FISHING ROD HANDLE
Filed Oct. 7, 1946
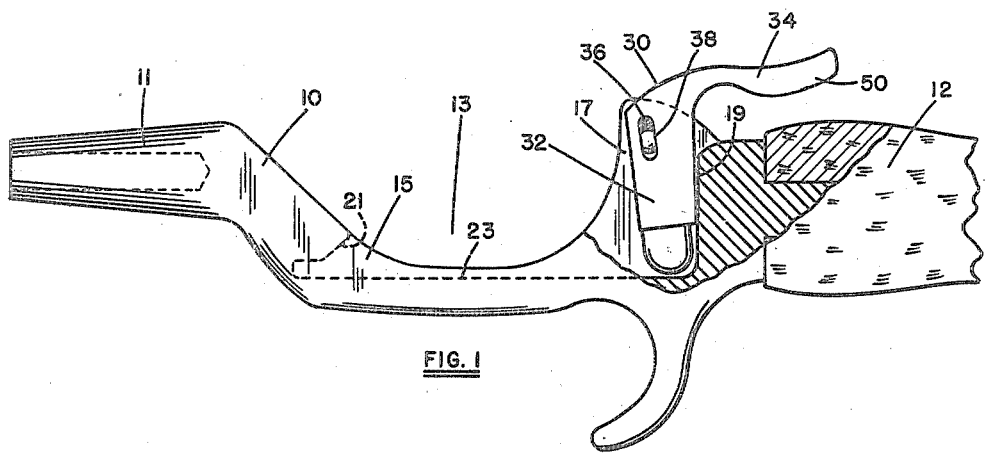
FIG. 1
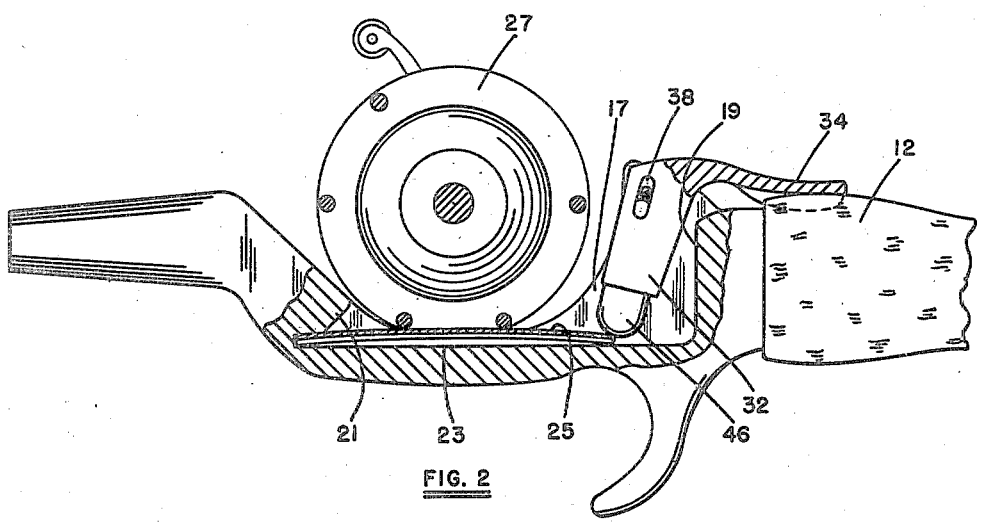
FIG. 2
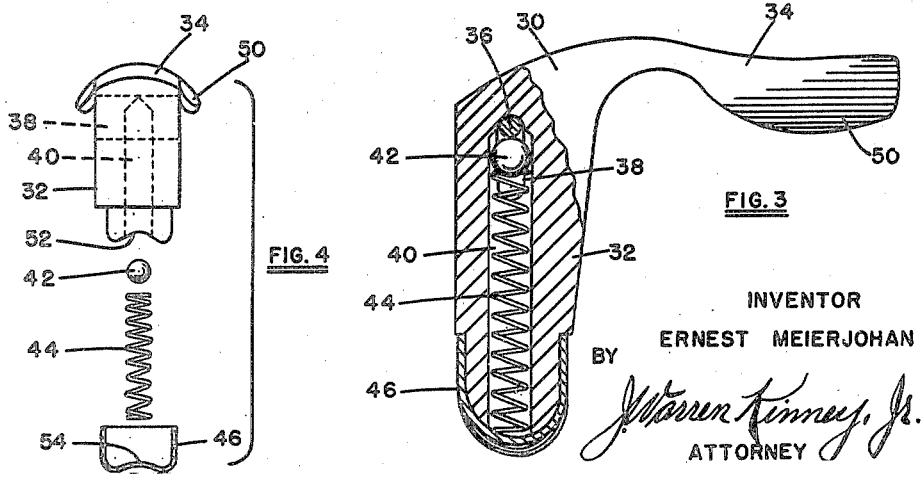
FIG. 4
FIG. 3
INVENTOR
ERNEST MEIERJOHAN
BY
J. Warren Kinney, Jr.
ATTORNEY Patented Jan. 31, 1950

2,495,980

UNITED STATES PATENT OFFICE 2,495,980

FISHING ROD HANDLE

Ernest Meierjohan, Cincinnati, Ohio

Application October 7, 1946, Serial No. 701,703

8 Claims. (Cl. 43—22)

This invention relates to fishing rods, and more particularly to an improved fishing rod handle.

An object of the present invention is to provide a fishing rod handle having associated therewith a simple, quick acting thumb actuated reel attaching means.

Another object of the invention is to provide a fishing rod handle having a thumb actuated reel locking lever which is adapted to be positioned in one or the other of two normal positions, that is fully locked, or entirely released.

Another object of the invention is to provide a fishing rod handle having a spring loaded reel locking lever which will automatically accommodate various sizes, shapes and thicknesses of reel base plates.

A further object of the invention is to provide a fishing rod handle having reel locking means which serve a dual purpose of holding a reel in place and of providing a convenient thumb rest for the user of the device.

Another object of the invention is to provide a fishing rod handle having simple, rugged, yet highly efficient reel locking means associated therewith.

Another object of the invention is to provide a fishing rod handle having reel locking means associated therewith which can be actuated by one hand.

Still a further object of the invention is to provide a fishing rod handle having reel locking means associated therewith which cannot be accidentally or unintentionally released from a reel engaging position, but which requires a positive and deliberate act on the part of the user of the device before a reel can be disengaged from the handle.

Another object of the invention is to provide a fishing rod handle having the hereinabove described characteristics and which is adapted to be produced using modern mass production methods.

These and other objects are attained by the means described herein and as disclosed in the accompanying drawings, in which:

Fig. 1 is a side view of a fishing rod handle embodying the teachings of the present invention, wherein parts have been broken away to reveal certain structural details.

Fig. 2 is a side view of a fishing rod handle, similar to that of Fig. 1, but with a reel locked in place in such a manner as to preclude its accidental or unintentional release from the handle.

Fig. 3 is an enlarged side view of a reel locking lever, which comprises a detail of the present invention, partly in section for clarity of detail and understanding.

Fig. 4 is a front view of the reel locking lever of Fig. 3, but on a reduced scale, and showing the various elements which comprises the completed lever in extending relationship.

With reference to Figs. 1 and 2, it will be observed that a fishing rod handle denoted generally by the numeral 10 comprises, broadly speaking, a forward rod receptive portion 11, a rearward handle grip portion 12 and a reel seat portion 13 disposed intermediate the forward and rear portions.

In the preferred embodiment of the invention, the reel seat portion 13 is defined by a pair of laterally spaced walls 15 and 17, an upstanding rear wall 19, an undercut front wall 21 and a bottom wall 23. The overall length of the elongated reel seat is of a dimension somewhat greater than the overall length of the base plate 25 of a fishing reel, denoted generally by the numeral 27.

It should be understood that the present invention is not concerned with, nor directed to, the structural details of reel 27, except insofar as its base plate 25 shall be of a dimension to be receivable within seat 13. It may be noted that the base plates of reels are almost universally concave in transverse section, as illustrated in Fig. 2 of the drawings.

A substantially L shaped reel locking member 30 comprising a depending portion 32 and a rearwardly extending or actuating portion 34 is pivotally mounted to the handle on pin 36 which spans side walls 15 and 17, and which is spaced forwardly of rear wall 19 for disposing the locking member in overhanging relationship with the rear end of seat 13.

With particular reference now to Figs. 3 and 4, it will be observed that an elongated pin receptive slot 38 is provided thru the upper end of depending portion 32, said depending portion being likewise provided with an axial bore 40 extending from the lower end thereof up to and in communication with slot 38. A spherical bearing member 42 and a spring 44 are adapted to be received within bore 40, being held in place by a cap member 46 which may be secured to the lower end 52 of depending portion 32 by means of a force fit, or the like.

In the preferred embodiment of the invention, the lower end 52 of depending portion 32 is provided with a raised central portion, as is bottom 54 of cap 46. Said raised central portion is adapted to engage and center the hereinabove referred to concave reel base plate relative to seat 13.

With reference now to Fig. 3, it will be observed that pin 36 will normally be yieldably urged upwardly to engage the upper end of slot 38, likewise end 52 of depending portion 32 will be continuously urged downwardly away from said pin.

The lower end 52 of locking member 30 is adapted to be moved arcuately about pin 36 between contacting and non-contacting positions relative to the rear end of a reel base plate. Said locking member is likewise adapted for endwise movement relative to pin 36 by reason of the structure disclosed in Fig. 3, wherefore it will be observed that the rear end of a reel base plate will be positively, though yieldingly, forced forwardly and downwardly relative to seat 13 when the locking member is moved to the position disclosed in Fig. 2.

In the preferred embodiment of the invention, the rearwardly extending portion 34 of locking member 30 is arcuate in form to overlappingly engage the upper forward end of handle 12, and in addition thereto it is provided with an overhanging thumb portion 50 for enabling the use of such a handle to quickly and easily manipulate the locking member from a locked to an unlocked position using but one hand.

It will be observed that the lower end 52 of the locking member will be moved past center incident to being moved to the contacting or locked position illustrated in Fig. 2, wherefore the reel will be securely held in place against accidental or unintentional displacement. In order to release the reel it will require a positive and deliberate act on the part of the user of the device to lift upwardly on actuator portion 34.

From the foregoing it will be observed that I have provided a fishing rod handle having a reel locking member which though simple will enable a fisherman to quickly and positively lock a reel to the handle by merely depressing actuator portion 34 of the locking member. I have obtained excellent results using handle members and locking members fabricated from cast aluminum and wherein cap member 46 is fabricated from a hard, wear resisting material, such as stainless steel or the like.

It should be understood that various modifications may be made in the structural details of the invention, within the scope of the appended claims, without departing from the spirit of the invention.

What is claimed is:

1. A fishing rod handle member having a reel seat disposed intermediate its length to receive the base plate of a line reel, said seat terminating at its forward end in an undercut portion into which the forward end of a reel base plate is receivable, a locking member pivotally connected to the handle member above and overhanging the rear portion of said seat, said locking member movable arcuately about said pivotal connection from a contacting to a non-contacting relationship with the rear portion of a reel base plate mounted in said seat, and means housed within said locking member for providing endwise movement thereof about said pivotal connection, said locking member when in a contacting relationship forcing said base plate forwardly and downwardly relative to said seat for precluding accidental or unintentional displacement therefrom.

2. A fishing rod handle member having a reel seat disposed intermediate its length to receive the base plate of a line reel, said seat terminating at its forward end in an undercut portion into which the forward end of a reel base plate is receivable, a locking member pivotally connected to the handle member and overhanging the rear portion of said seat, said locking member movable arcuately about said pivotal connection from a contacting to a non-contacting relationship with the rear portion of a reel base plate mounted in said seat, and spring means secured to and carried by said locking member for providing limited, yieldable, endwise movement thereof about said pivotal connection, said locking member when in a contacting relationship yieldingly forcing said base plate forwardly and downwardly relative to said seat.

3. A fishing rod handle member having a reel seat disposed intermediate its length to receive the base plate of a reel, said seat defined by a pair of laterally spaced side walls, an upstanding rear wall and an undercut front wall, a pin spanning said side walls and spaced forwardly of said rear wall, a locking member pivotally mounted on said pin, said member including a depending portion for movement from a contacting to a non-contacting relationship with the rear end of the base plate of a reel mounted in said seat, said member having an elongated pin receptive slot for providing arcuate as well as endwise movement of said member relative to said pin, and means housed within said member for normally and yieldingly urging said depending portion downwardly away from said pin for locating said pin at the upper end of said slot.

4. A fishing rod handle member having a reel seat disposed intermediate its length to receive the base plate of a reel, said seat defined by a pair of laterally spaced side walls, an upstanding rear wall and an undercut front wall, a pin spanning said side walls and spaced forwardly of said rear wall, a locking member pivotally mounted on said pin, said member including a depending portion for movement from a contacting to a non-contacting relationship with the rear end of the base plate of a reel mounted in said seat, said member having an elongated pin receptive slot for providing arcuate as well as endwise movement of said member relative to said pin, and means housed within said member for normally and yieldingly urging said depending portion downwardly away from said pin for locating said pin at the upper end of said slot, said means comprising a spring biased bearing element located under said pin.

5. A fishing rod handle member having a reel seat disposed intermediate its length to receive the base plate of a reel, said seat defined by a pair of laterally spaced side walls, an upstanding rear wall and an undercut front wall, a pin spanning said side walls and spaced forwardly of said rear wall, a locking member pivotally mounted on said pin, said member including a depending portion for movement from a contacting to a non-contacting relationship with the rear end of the base plate of a reel mounted in said seat, said member having an elongated pin receptive slot for providing arcuate as well as endwise movement of said member relative to said pin, said depending portion having a bore extending from its lower end up to and in communication with said slot, a bearing element housed within said bore, a cap secured to and carried by the end of said depending portion, and means housed within said bore and interposed between said bearing element and cap for yieldingly urging said bearing element in contact with said pin and for normally urging the end of said depending portion downwardly away from said pin.

6. A fishing rod handle member having a reel seat disposed intermediate its length to receive the base plate of a line reel, said seat defined by a pair of laterally spaced side walls, a reel plate locking member disposed between and pivotally connected to said side walls, and means housed within said member for providing limited, yieldable, endwise movement of said member relative to said pivotal connection.

7. A fishing rod handle member having a reel seat disposed intermediate its length to receive the base plate of a reel, said seat being defined by a pair of upstanding laterally spaced side walls which terminate at their rear ends in a portion of said handle member and at their front ends in a transversely extending pocket into which the forward end of the base plate of a reel is receivable, and means between the side walls adjacent their rear ends and pivotally mounted above and in overhanging relationship with the rearward portion of said seat, said means including a depending portion the free end of which forms a clamping member constructed to progressively engage the rear end of a base plate located in the seat incident to movement of said means about its pivotal connection and for simultaneously shifting said base plate forwardly for disposing its forward end within said pocket for precluding accidental or unintentional displacement therefrom.

8. A fishing rod handle comprising a forwardly extending rod receptive portion, a rearwardly extending hand grip portion, a reel seat defined by a pair of laterally spaced upstanding side walls disposed intermediate said portions, and a reel latching member pivotally mounted between said side walls and in overhanging relationship with that portion of the reel seat adjacent said hand grip portion for movement from a contacting to a non-contacting relationship with the rear portion of a reel base plate disposed within said seat, said latching member including a rearwardly extending portion projecting from between said side walls and including a thumb portion dimensioned to follow the top contour of said hand grip portion and snugly overlie the seat adjacent end of said hand grip portion when said latching member is in a base plate contacting position.

ERNEST MEIERJOHAN.

REFERENCES CITED

The following references are of record in the file of this patent:

UNITED STATES PATENTS

| Number | Name | Date |
|---|---|---|
| 553,725 | Roll | Jan. 28, 1896 |
| 1,464,154 | Hooper | Aug. 7, 1923 |
| 1,591,122 | Gephart | July 6, 1926 |
| 1,663,853 | Newville | Mar. 27, 1928 |
| 2,111,080 | Stromgren | Mar. 15, 1938 |
| 2,289,216 | Seidel | July 7, 1942 |
| 2,422,084 | Dorner | June 10, 1947 |

FOREIGN PATENTS

| Number | Country | Date |
|---|---|---|
| 84,608 | Sweden | Aug. 15, 1935 |